(12) United States Patent
Suzuki

(10) Patent No.: US 7,545,573 B2
(45) Date of Patent: Jun. 9, 2009

(54) PROJECTOR OPTICAL SYSTEM, PROJECTOR, AND METHOD FOR FORMING REAL IMAGE IN USE OF PROJECTOR OPTICAL SYSTEM

(75) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/969,879

(22) Filed: Jan. 4, 2008

(65) Prior Publication Data

US 2008/0180804 A1 Jul. 31, 2008

(30) Foreign Application Priority Data

Jan. 10, 2007 (JP) .............................. 2007-002216

(51) Int. Cl.
G02B 3/00 (2006.01)
G02B 5/18 (2006.01)
G02B 13/04 (2006.01)
G02B 9/12 (2006.01)

(52) U.S. Cl. ........................ 359/651; 359/558; 359/753; 359/784; 359/900

(58) Field of Classification Search ......... 359/649–651, 359/558, 740, 784, 785, 792, 708, 716, 749, 359/753, 900
See application file for complete search history.

(56) References Cited

U.S. PATENT DOCUMENTS

| | | | |
|---|---|---|---|
| 5,703,721 A | 12/1997 | Bietry et al. | |
| 5,930,043 A | 7/1999 | Ogawa | |
| 5,969,875 A | 10/1999 | Sugawara | |
| 6,208,474 B1 | 3/2001 | Kondo | |
| 6,317,268 B1 * | 11/2001 | Harrigan | 359/649 |
| 6,693,744 B2 | 2/2004 | Shimomura | |
| 6,765,731 B1 | 7/2004 | Cannon | |
| 2005/0201249 A1 | 9/2005 | Ikenaka | |
| 2005/0201250 A1 | 9/2005 | Mimori et al. | |
| 2008/0019001 A1 | 1/2008 | Suzuki | |

FOREIGN PATENT DOCUMENTS

| | | |
|---|---|---|
| EP | 1 862 826 | 12/2007 |
| JP | 9-171146 | 6/1997 |
| JP | 10-142502 | 5/1998 |
| JP | 10-170818 | 6/1998 |
| JP | 2000-66093 | 3/2000 |
| JP | 2002-156580 | 5/2002 |
| JP | 2003-195165 | 7/2003 |
| JP | 2004-117520 | 4/2004 |

(Continued)

*Primary Examiner*—William C Choi
*Assistant Examiner*—Jack Dinh
(74) *Attorney, Agent, or Firm*—Miles & Stockbridge P.C.

(57) ABSTRACT

A projector optical system for forming a real image by projecting an image of a display element has, sequentially from a screen side or an observation side, a first lens group having positive refractive power, an aperture diaphragm, a second lens group, and a third lens group having positive refractive power, with a diffractive optical element being provided on at least one of the first lens group and the second lens group which are adjacent to the aperture diaphragm. The projector optical system satisfies:

$0.05 < G/L < 0.9$ wherein G is an air gap on the optical axis between the second lens group and the third lens group, and L is a length on the optical axis, from the surface that is closest to the screen side to the display element.

22 Claims, 10 Drawing Sheets

FOREIGN PATENT DOCUMENTS

| | | |
|---|---|---|
| JP | 2004-279958 | 10/2004 |
| JP | 2004-279958 A | 10/2004 |
| JP | 2005-275280 | 10/2005 |
| JP | 2008-26440 | 2/2008 |
| WO | 2004/095108 | 11/2004 |
| WO | 2005/088624 | 9/2005 |
| WO | 2005/088625 | 9/2005 |
| WO | 2006/090614 | 8/2006 |

* cited by examiner

PROJECTOR OPTICAL SYSTEM, PROJECTOR, AND METHOD FOR FORMING REAL IMAGE IN USE OF PROJECTOR OPTICAL SYSTEM

INCORPORATION BY REFERENCE

This invention claims the benefit of Japanese Patent Application No. 2007-002216 which is hereby incorporated by reference.

FIELD OF THE INVENTION

The present invention relates to a projector optical system, a projector having this projector optical system, and a method for forming a real image in use of this projector optical system.

BACKGROUND OF THE INVENTION

Projectors are devices that use a display element such as a liquid crystal device (LCD, LCOS), a DMD or the like as a light valve, so that the display image thereof is enlarged and projected onto a screen or the like by means of a projector optical system. As a result of ever more demanding performances (high-pixel counts) in display elements, there have been proposed various high-performance projectors that afford both high resolution and sufficient correction of various aberrations (for instance, Japanese Unexamined Patent Application Laid-open No. 2004-279958).

In high-performance projector optical systems, however, the lens count increases for the sake of achromatism, which results in greater system size and precludes achieving a smaller size of the projector as a whole, all of which is problematic.

SUMMARY OF THE INVENTION

In light of the above problems, it is an object of the present invention to provide a projector optical system that affords good image forming performance and small size, by using a diffractive optical element.

A further object of the invention is to provide a projector comprising the projector optical system, and a method for forming a real image in use of this projector optical system.

The projector optical system according to the present invention is a projector optical system for forming a real image by projecting an image of a display element, comprising: sequentially from a screen side or an observation side, a first lens group having positive refractive power; an aperture diaphragm; a second lens group; a third lens group having positive refractive power; and a diffractive optical element provided in at least one of the first lens group and the second lens group which are adjacent to the aperture diaphragm, the projector optical system satisfying:

$$0.05 < G/L < 0.9$$

wherein G is an air gap on the optical axis between the second lens group and the third lens group, and L is a length on the optical axis, from the surface that is closest to the screen side or the observation side to the display element.

In the above projector optical system, preferably, the diffractive optical element is formed by a multilayer diffractive optical element in which diffraction gratings formed on two diffractive element components are arranged facing each other.

In the above projector optical system, preferably, the diffractive optical element is formed by a bonded multilayer diffractive optical element in which diffraction gratings formed on two diffractive element components are arranged closely bonded facing each other.

Preferably, the above projector optical system further satisfies $$0.005 < \Delta Nd < 0.45$$

wherein $\Delta Nd$ is a difference between refractive indices of the two diffractive element components for a main wavelength (d-line).

Preferably, the above projector optical system further satisfies $$50 < \Delta vd/\Delta Nd < 2000$$

wherein $\Delta vd$ is an Abbe number difference between the two diffractive element components.

Preferably, the above projector optical system further satisfies $$0.03 < h/d < 2.0$$

wherein h is a grating height of the diffraction gratings that form the diffraction optical surface of the diffractive optical element, and d is a thickness of the diffractive element component having the smaller thickness on the optical axis, among the diffractive element components.

In the above projector optical system, preferably, the second lens group comprises a positive lens.

In the above projector optical system, preferably, the second lens group has positive refractive power.

Preferably, the above projector optical system is symmetrical with respect to the optical axis, and is configured such that a main light ray of a largest image height has an image ray angle not greater than 10 degrees when passing through the diffraction optical surface of the diffractive optical element, and the projector optical system further satisfies $$0.1 < C/f < 2.5$$

wherein C is an effective diameter of the diffraction optical surface, and f is a whole-system focal distance.

Preferably, the above projector optical system further satisfies $$(Eg+EC)/2 > 0.6 \times Ed$$

wherein Ed is a diffraction efficiency design value for a main wavelength (d-line) of the diffraction optical surface of the diffractive optical element, Eg is a diffraction efficiency design value for a short wavelength (g-line) relative to the main wavelength, and EC is a diffraction efficiency design value for a long wavelength (C-line) relative to the main wavelength.

The above projector optical system may comprise a cemented lens of a positive lens, and a positive lens and a negative lens, wherein the diffraction optical surface of the diffractive optical element is formed adjacent to any surface of the positive lenses.

In the above projector optical system, preferably, a wall of the diffraction grating is imparted with a slope toward a pupil and is formed at a tilt relative to the optical axis.

The above projector optical system may comprise four or fewer positive lens components and one negative lens component.

The above projector optical system may comprise four or more positive lens components.

The above projector optical system may comprise three positive lens components.

The above projector optical system may comprise three positive lenses.

Preferably, the above projector optical system further satisfies $$0.3 < f1/f2 < 100.0$$

wherein f1 is a focal distance of the first lens group and f2 is a focal distance of the second lens group.

In the above projector optical system, preferably, the diffraction optical element is arranged on a surface facing a center of curvature on the aperture diaphragm side.

A projector according to the present invention comprises the above projector optical system, wherein a real image is formed on the display element by projecting light rays that are emitted from a light source and that are irradiated onto the display element, are reflected by or transmitted through the display element, and by passing the light rays sequentially through the third lens group, the second lens group, the aperture diaphragm and the first lens group A method for forming a real image in use of a projector optical system according to the present invention is a method for forming a real image by projecting an image of a display element in use of a projector optical system, wherein the projector optical system comprises: sequentially from a screen side or an observation side, a first lens group having positive refractive power; an aperture diaphragm; a second lens group; a third lens group having positive refractive power; and a diffractive optical element provided in at least one of the first lens group and the second lens group which are adjacent to the aperture diaphragm, the projector optical system satisfying $$0.05 < G/L < 0.9$$

wherein G is an air gap on the optical axis between the second lens group and the third lens group, and L is a length on the optical axis, from the surface that is closest to the screen side or the observation side to the display element.

In the above method for forming a real image in use of a projector optical system, preferably, the diffractive optical element is formed by a multilayer diffractive optical element in which diffraction gratings formed on two diffractive element components are arranged facing each other.

In the above method for forming a real image in use of a projector optical system, preferably, the projector optical system is symmetrical with respect to the optical axis, and is configured such that a main light ray of a largest image height has an image ray angle not greater than 10 degrees when passing through the diffraction optical surface of the diffractive optical element, the projector optical system further satisfying $$0.1 < C/f < 2.5$$

wherein C is an effective diameter of the diffraction optical surface, and f is a whole-system focal distance.

The projector optical system according to the present invention, a projector comprising such a projector optical system, and a method for forming a real image in use of such a projector optical system, allow achieving good image forming performance while achieving weight and size reductions, and are ideally used in, for instance, optical systems for small projectors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 2 is an explanatory diagram illustrating a multilayer diffractive optical element, wherein

DESCRIPTION OF THE PREFERRED EMBODIMENTS

Figure 1:
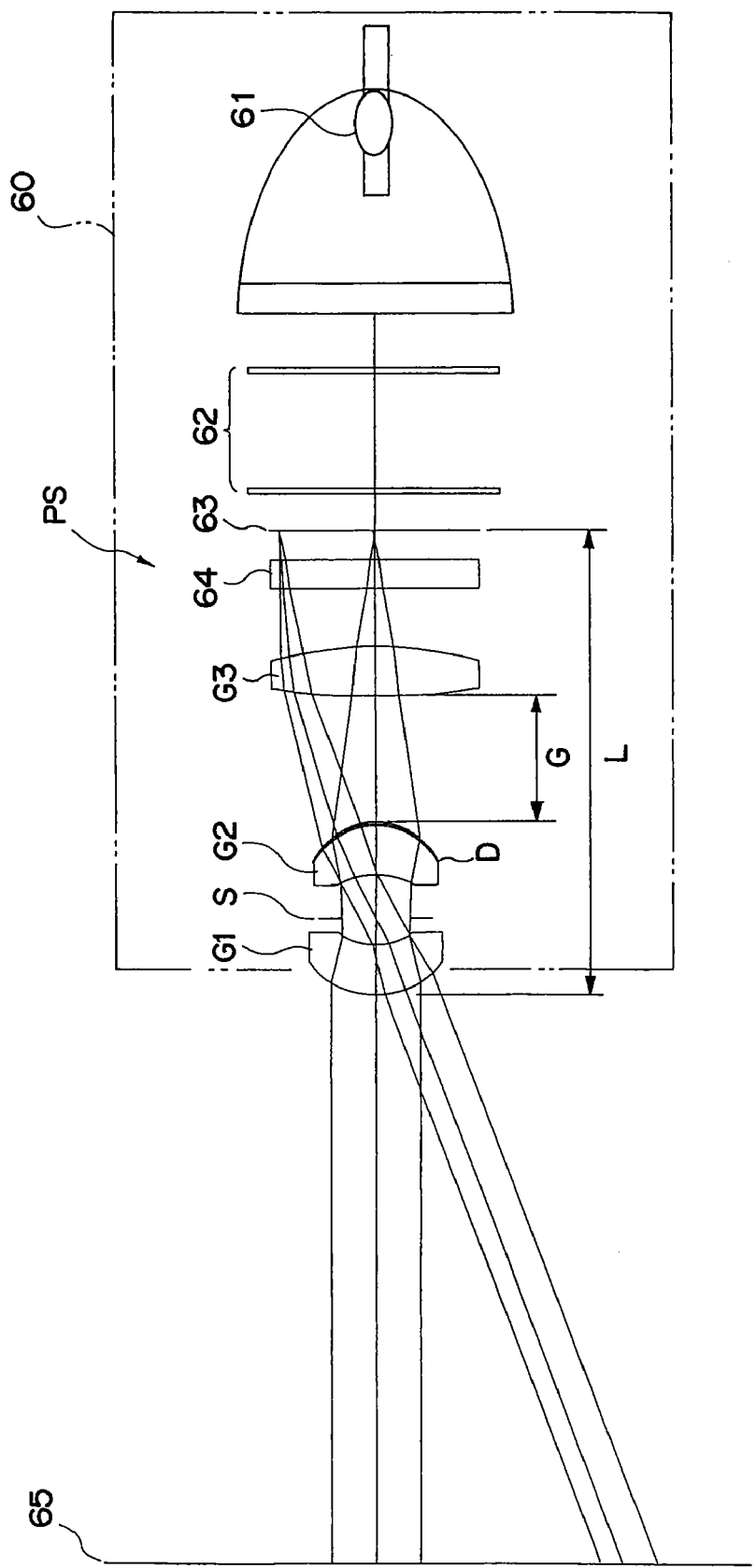
FIG. 1 is a diagram illustrating a lens constitution of a projector using a projector optical system.

Preferred embodiments of the present invention are described below with reference to accompanying drawings. The constitutions of a projector according to the present embodiment, and of a projector optical system used in the projector, are explained first with reference to FIG. 1. In a projector optical system PS used in a projector 60, light emitted by a light source 61 is irradiated, in a homogenous state via an integrator lens 62, onto a display element 63, as illustrated in FIG. 1. An image of the light rays reflected by, or passing through, the display element 63 (FIG. 1 illustrates an instance of light rays passing through the display element 63) is enlarged and projected, as a real image, onto a screen 65, or is directly observed by an observer. To ensure brightness, a projector optical system must ordinarily have a small F-number and also small chromatic aberration, so as to reduce color shift in the image. It is important also that the projector optical system should be small and lightweight, for it to be installed in a mobile device or the like. The projector optical system explained below combines resin lens technology and diffraction optical technology so as to achieve small, lightweight, high-performance projection lenses, and to achieve, furthermore, an optical system having a distant pupil position, with a view to realizing a projector optical system suitable for a liquid crystal display element or the like.

The projector optical system PS has, sequentially from the screen 65 side or the observation side, a first lens group G1 having positive refractive power, an aperture diaphragm S, a second lens group G2, and a third lens group G3 having positive refractive power, such that a diffraction optical surface D of a diffractive optical element is formed on a lens group adjacent to the aperture diaphragm S, i.e., on the first lens group G1 or the second lens group G2 (hereinafter, the diffraction optical surface D of a diffractive optical element, which in the instance illustrated in FIG. 1 is formed on the second lens group G2, will be called diffraction optical surface D). In the projector optical system PS illustrated in FIG. 1 a transmissive liquid crystal device (LCD (Liquid Crystal Display) panel) is used as the display element 63. In the projector optical system PS illustrated in FIG. 1 there may also be provided a protective glass 64 for protecting the display element 63. Of course, the display element 63 is not limited to an LCD. Herein, a DMD (Digital Micromirror Device) or a reflective liquid crystal display device (LCOS (Liquid Crystal on Silicon) panel) may also be used as the display element 63.

When using such a reflective or transmissive liquid crystal device as the display element 63, a positive field lens is preferably arranged to be as telecentric as possible relative to the display element 63, with a view to using illumination light efficiently. In order to enhance telecentricity relative to the display element 63, the third lens group G3 (convex field lens) having positive refractive power is arranged at a closest position to the display element 63 of the projector optical system PS. In such a projector optical system PS, thus, light rays from the light source 61 are homogenized by the integrator lens 62, pass through the display element 63, the protective glass 64, the third lens group G3, the second lens group G2, the aperture diaphragm S and the first lens group G1, in this order, becoming thereby enlarged and projected onto the screen 65.

As described above, a diffraction optical surface D is provided on the first lens group G1 or the second lens group G2 comprised by the projector optical system PS (in the present embodiment, the diffraction optical surface D is provided on the second lens group G2). The diffraction optical surface D is used for chromatic aberration correction. The diffraction optical surface D is provided on a lens surface inside, before or after the first lens group G1 or the second lens group G2 adjacent to the aperture diaphragm S.

Known methods for bending a light ray include, for instance, refraction, reflection, and also diffraction, as a third method. A diffractive optical element, which is an optical element that exploits diffractive phenomena of light, exhibits a behavior that differs from reflection and refraction. Specific conventional examples of diffractive optical elements include, for instance, diffraction gratings and Fresnel zone plates. In the present examples, the diffractive optical element is an optical element on which there is created a surface having the effect of bending light rays through diffractive phenomena, for instance by creating a Fresnel zone plate and/or a diffraction grating on the surface of an optical member made of glass, plastic or the like, so that the light-bending effect imparts the optical system with good optical performance. Such surfaces having the effect of bending light rays through diffractive phenomena are called diffraction optical surfaces. Optical elements having such surfaces are ordinarily called diffractive optical elements.

Although having positive refractive power, such diffractive optical elements have negative dispersion, a characteristic that makes them extremely effective for chromatic aberration correction. Hence, such diffractive optical elements allow achieving good chromatic aberration correction, which is not possible with ordinary glass, and/or achieving good chromatic aberration correction, possible only using expensive special low-dispersion glass.

When used built into an optical system, the optical design characteristics of such diffractive optical elements include, for instance, negative dispersion, abnormal dispersion, and aspherical surface effect. The optical element affords also a Petzval sum of 0, as well as easy light branching and multiplexing. The change of refractive power with temperature is small, and the element can be made thinner. The following features are of interest, in particular, when such a diffractive optical element is used in a projector optical system. Firstly, the diffractive optical element has a negative dispersion value (Abbe number=−3.453), a large dispersion, and a strong abnormal dispersion (partial dispersion ratio=0.2956), and hence it possesses a potent chromatic aberration correction power. The magnitude of the Abbe number of the diffractive optical element is 1/10 or less than that of glass since the Abbe number of the latter ranges ordinarily from about 30 to about 80. In other words, a diffractive optical element bends light more strongly the longer the wavelength is. A diffractive optical element can provide good chromatic aberration correction, which is unachievable for ordinary glass. Secondly, using a diffractive optical element allows reducing the size and the weight of the projector optical system. The blazed structure and the good achromatic effect of the diffraction grating allow reducing cemented lenses, thereby affording thinner profiles.

Figure 2A:
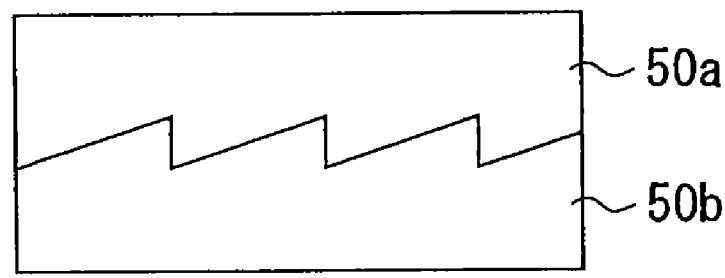
FIG. 2A illustrates a bonded type thereof and FIG. 2B illustrates a decoupled type thereof.
Figure 2B:
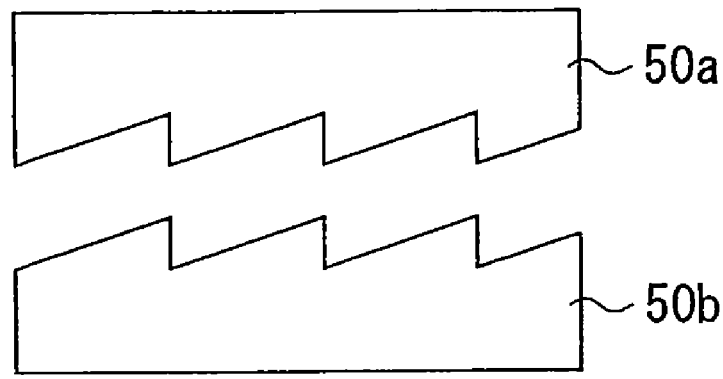

As a side effect, however, diffraction light gives rise to flare, which impairs image quality, except for specific orders/face angles/wavelengths, and hence diffractive optical elements have been limited to monochromatic applications such as pickup lenses or the like. Recent research has shown, nonetheless, that the diffractive effect can be substantially enhanced over a broad wavelength region by stacking plural diffractive elements. This has paved the way for the use of diffractive optical elements in projector optical systems. FIG. 2 illustrates an example of a multilayer diffractive optical element in which two optical element components, having formed thereon respective diffraction gratings, are arranged with the diffraction gratings facing each other. FIG. 2A illustrates a bonded multilayer constitution, in which diffraction gratings are formed on respective diffractive element components 50a, 50b, and then the diffraction gratings are bonded together, while FIG. 2B illustrates a decoupled-type multilayer constitution in which the two diffractive element components 50a, 50b are arranged with the diffraction gratings facing each other with a predetermined gap therebetween. The present example illustrates a constitution in which the diffraction optical surface D provided in the second lens group G2 comprises a bonded multilayer diffractive optical element.

The diffraction efficiency of a bonded multilayer diffractive optical element is considered next. The diffraction efficiency for the d-line, F-line and the C-line can reach 100%, and a wide band can be achieved when a difference Δ(NF−NC) of a main dispersion NF−NC (NF is the refractive index for the F-line (λf=486.1 nm) and NC is the refractive index for the C-line (λc=656.3 nm)) satisfies the following formula:

$$\Delta Nd / \Delta(NF - NC) = \lambda d / (\lambda f - \lambda c)$$
$$= -3.453$$

wherein Nd is a reference refractive index for a main wavelength (d-line, λd=587.6 nm), and ΔNd is the reference refractive index difference between the two diffractive element components (grating materials) that make up a bonded multilayer diffractive optical element.

Figure 3:
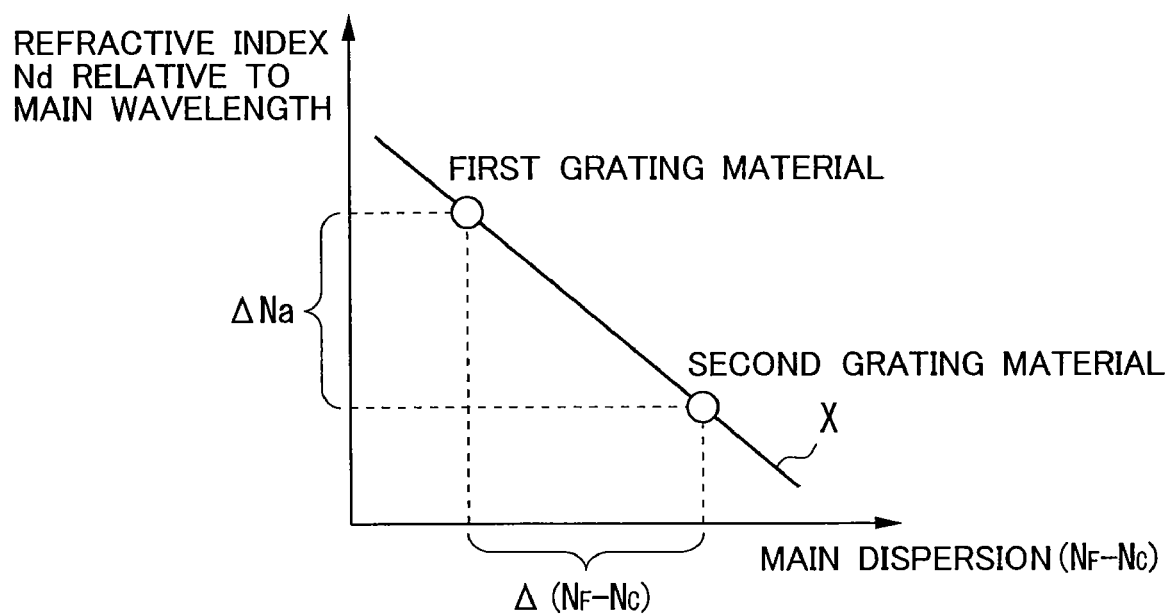
FIG. 3 is an explanatory diagram illustrating a glass map distribution of two diffractive element components comprised in a multilayer diffractive optical element.

That is, upon selecting an appropriate grating material on a glass map, the slope of the straight line X illustrated in FIG. 3 that joins the two grating materials that form a bonded multilayer diffractive optical element should coincide with the Abbe number (=−3.435). The grating material may be selected from any point on the straight line X, although in practice sufficiently high diffraction efficiency can be achieved even for points diverging somewhat from the straight line X.

Preferably, the angle of the light ray passing through the diffraction optical surface of the optical system should normally be as small as possible. Ordinarily, many of the surfaces of the blazes (walls) of the grating are substantially perpendicular, so that when the angle of the light rays passing through the diffraction optical surface is large, the diffraction optical surface is apt to give rise to flare (a phenomenon in which light other than that of a predetermined blazed order becomes detrimental light that reaches the projection surface), which impairs image quality. In the case of the present projector optical system PS, therefore, the angle of the light rays passing through the diffraction optical surface D is preferably not greater than 10 degrees, with a view to obtaining a good image not unduly influenced by the flare generated by the diffraction optical surface. If at all possible, that condition is more easily and hence preferably satisfied by forming the diffraction optical surface D on a convex surface on the display element 63 side, although the diffraction optical surface D may also be arranged at the position of the first lens group G1 or the second lens group G2. To elicit a full effect, the angle of the light rays passing through the diffraction optical surface D is more preferably not greater than 5 degrees. Stacking a plurality of such gratings using a multilayer diffractive optical element allows enhancing diffraction efficiency over a wavelength wide band while reducing flare, and hence such stacks are suitably used in cameras and projectors.

The conditions for constituting the projector optical system PS according to the present example are explained next. The projector optical system PS satisfies conditional equation (1)

$$0.05 < G/L < 0.9 \quad (1)$$

wherein G is an air gap on the optical axis between the second lens group G2 and the third lens group G3, and L is a length on the optical axis (total length) from the surface that is closest to the screen side or the observation side (screen side surface of the first lens group) to the display element 63.

Conditional equation (1) prescribes an appropriate range for the ratio of the gap G between the second lens group G2 and the third lens group G3 relative to the total length L of the projector optical system PS. Exceeding the upper limit of conditional equation (1) implies an excessively long total length, which not only precludes achieving size reduction but increases the size of the lens system, all of which is inconvenient. Also, the occurrence of off-axis aberration increases, which undesirably precludes achieving good image formation performance. Astigmatism, in particular, becomes large, which impairs image quality. Below the lower limit of conditional equation (1), conversely, the exit pupil position of the optical system draws too near, which is likely to result in an undesirable deviation of incidence on the display element 63 under near-telecentric conditions. Distortion tends also to be likelier on the positive side. To fully bring out the effect of conditional equation (1), the upper limit thereof is preferably set to 0.7 and the lower limit is set to 0.12.

When in the present example the diffraction optical surface D is formed through a multilayer diffractive optical element, conditional equation (2) is preferably satisfied also.

$$0.005 < \Delta Nd < 0.45 \quad (2)$$

wherein $\Delta Nd$ is a refractive index difference between the refractive indices of two diffractive element components that make up the multilayer diffractive optical element, relative to a main wavelength (d-line).

Conditional equation (2) prescribes an appropriate refractive index difference at the interface where the grating is formed. Exceeding the upper limit of conditional equation (2) implies an excessively large $\Delta Nd$, and hence excessive error sensitivity and excessive manufacturing error sensitivity, which is problematic. Reflectance at the interface becomes also larger, which undesirably increases the likelihood of reflection flare and/or reflection ghost. Below the lower limit of conditional equation (2), the height of the grating becomes too large, which is disadvantageous during manufacture, the blazed portions cast a shadow, the diffraction efficiency of the blaze light drops, while there increases stray light through scattering or reflection of light striking the walls, all of which is problematic. The angle characteristic of diffraction efficiency is also impaired, while the flare caused by the incident light increases, thereby detracting from image quality. With a view to bringing out the full effect of conditional equation (2), the upper limit thereof is preferably set to 0.15 and the lower limit is set to 0.01.

Also, loss of diffraction efficiency is prevented by forming the diffraction optical surface D, provided on the first lens group G1 or the second lens group G2, using a bonded multilayer diffractive optical element since, unlike in a decoupled diffractive optical element, when one grating height deviates from the design value the other grating acquires automatically the same height. Also, the grating interface in a bonded multilayer type exhibits a smaller refractive index, which reduces the influence of the grating interface roughness (since dispersion is believed to vary normally in proportion to the square of the refractive index difference). Moreover, there arises fundamentally no eccentricity between the two diffractive element components, which makes for good-precision alignment between the two gratings (and, in consequence, a smaller loss in diffraction efficiency).

In the present embodiment, when the diffraction optical surface D provided on the first lens group G1 or the second lens group G2 results from a bonded multilayer diffractive optical element, the conditional equation below is also preferably satisfied, in addition to the above conditional equations. Preferably, conditional equation (3) is satisfied $$50 < \Delta vd/\Delta Nd < 2000 \quad (3)$$

wherein $\Delta vd$ is the Abbe number difference between the two grating materials (diffractive element components) that form the bonded multilayer diffractive optical element.

Conditional equation (3) prescribes a suitable range for the optical medium of a high-refractive index, low-dispersion material and a low-refractive index and high dispersion material that make up a bonded multilayer diffractive optical element. Exceeding the upper limit of conditional equation (3) precludes achieving high diffraction efficiency over a wavelength wide band. As a result, unwanted diffraction light gives rise to flare, in the so-called coma flare phenomenon, across the entire image plane, thus impairing image quality. Below the lower limit of conditional equation (3), likewise, high diffraction efficiency over a wavelength wide band cannot be achieved. As was the case when exceeding the upper limit, unwanted diffraction light gives thereupon rise to flare and to the so-called coma flare phenomenon across the entire image plane, thus impairing image quality. With a view to bringing out the full effect of conditional equation (3), the upper limit thereof is preferably set to 1000 and the lower limit is set to 200.

When the projector optical system is symmetrical with respect to an optical axis, and a main light ray of a largest image height has an image ray angle not greater than 10 degrees when passing through the diffraction optical surface D, the projector optical system further satisfies, preferably $$0.1 < C/f < 2.5 \quad (4)$$

wherein C is an effective diameter (diameter) of the diffraction optical surface D, and f is a whole-system focal distance of the projector optical system PS.

Conditional equation (4) prescribes an appropriate range for the effective diameter (diameter) of the diffraction optical surface D. Exceeding the upper limit of conditional equation (4) implies an excessively large diameter of the diffraction optical surface D, which results in a costlier, more difficult manufacture of the diffraction optical surface. The larger diameter makes it likelier for outer detrimental light to strike the diffraction optical surface D, thereby impairing image quality as a result of flare or the like. In terms of aberration, spherical aberration and coma have a greater occurrence, which impairs image quality. Below the lower limit of conditional equation (4), conversely, the appropriate effective diameter of the lens (the second lens group G2 in the present embodiment) having the diffraction optical surface D becomes too small, reinforcing the trend towards a smaller grating pitch on the diffraction optical surface D, which results not only in a costlier, more difficult manufacture of the diffraction optical element surface, but also in increased flare by the grating of the diffraction optical surface D, which impairs image quality. Reducing the effective diameter tends to shorten the focal distance of lenses in the vicinity of such effective diameter. Spherical aberration and/or distortion are likelier to increase as a result, thereby impairing image quality. With a view to bringing out the full effect of conditional equation (4), the upper limit thereof is preferably set to 0.8 and the lower limit is set to 0.15.

The projector optical system further satisfies, preferably $$(Eg + EC)/2 > 0.6 \times Ed \quad (5)$$

wherein Ed is the diffraction efficiency design value for a main wavelength (d-line), Eg is the diffraction efficiency design value for a short wavelength (g-line, $\lambda g = 435.8$ nm) relative to the main wavelength, and EC is a diffraction efficiency design value for a long wavelength (C-line) relative to the main wavelength.

Conditional equation (5) prescribes an appropriate range for a balance of diffraction efficiency (scalar calculation: intensity) in a wide-band situation. Beyond the upper and lower limits of conditional equation (5), diffraction efficiency drops for either short of long wavelengths, which increases diffraction flare and impairs image quality. In particular, unwanted diffraction light gives rise to flare, in the so-called coma flare phenomenon, across the entire image plane, thus impairing image quality. With a view to bringing out the full effect of conditional equation (5), the upper limit and the lower limit of the value in the right side of the equation (the coefficient by which Ed is multiplied) are preferably set, respectively, to 0.95 and to 0.6.

The projector optical system further satisfies, preferably $$0.03 < h/d < 2.0 \quad (6)$$

wherein h is the grating height of the diffraction grating that forms the diffraction optical surface D, and d is the thickness of the diffractive element component having the smaller thickness on the optical axis, among the two diffractive element components ($50a$, $50b$).

This conditional equation (6) shows the relationship between the grating height h and the thickness d which are suitable when forming thin gratings. When the upper limit of conditional equation (6) is exceeded the grating becomes relatively too high, which in addition to making manufacture of the grating shape more difficult, adds to the size of the grating blazed portions and increases the likelihood of stray light through, for instance, scattering of light striking the blazed portions, all of which is problematic. In particular, unwanted diffraction light gives rise to flare, in the so-called coma flare phenomenon, across the entire image plane, thus impairing image quality. Below the lower limit of conditional equation (6), conversely, the optical material that forms the grating becomes relatively too thick, which in addition to making manufacture of the grating shape more difficult, exacerbates internal absorption by the material, thus impairing transmissivity of the optical system as a whole and increasing the likelihood of coloring, all of which is problematic. Within the range of conditional equation (6), grating height is not excessive. As a result, manufacturing becomes easier, while the shade effect by the grating blazed portions (lessened diffraction efficiency) and flare caused by scattering can be prevented. With a view to bringing out the full effect of conditional equation (6), the upper limit thereof is preferably set to 0.4 and the lower limit is set to 0.002.

In addition to the above conditional equations, the below conditional equations are also preferably satisfied in the present embodiment. Firstly, the projector optical system further satisfies preferably conditional equation (7)

$$0.3 < f1/f2 < 100.0 \quad (7)$$

wherein f1 is a focal distance of the first lens group G1 and f2 is a focal distance of the second lens group G2.

Also, the projector optical system further satisfies preferably conditional equation (8)

$$0.05 < f3/f < 10.0 \quad (8)$$

wherein f3 is a focal distance of the third lens group G3.

Conditional equations (7) and (8) prescribe both an appropriate refractive power distribution for the lens groups. Firstly, conditional equation (7) prescribes an appropriate range for the refractive power balance between the focal distance f1 of the first lens group G1 and the focal distance f2 of the second lens group G2. Beyond the upper and lower limits of conditional equation (7), the appropriate refractive power balance for astigmatism correction breaks down, and aberrations, in particular spherical aberration, tend to increase, which impairs image quality. With a view to bringing out the full effect of conditional equation (7), the upper limit thereof is preferably set to 50 and the lower limit is set to 1.

Conditional equation (8) prescribes an appropriate refractive power for the entire third lens group (field lens) G3. Conditional equation (8) prescribes also appropriate conditions relating to telecentricity. Beyond the upper and lower limits of conditional equation (8), the appropriate refractive power balance for astigmatism correction breaks down, and aberrations, in particular spherical aberration, tend to increase, which impairs image quality. Below the lower limit of conditional equation (8), also, the pupil of the optical system draws too near, which is likely to result in an undesirable breakdown of telecentricity. Deviations from a telecentric situation makes shading likelier to occur, which may impair image quality as a result. With a view to bringing out the full effect of conditional equation (8), the upper limit thereof is preferably set to 3.0 and the lower limit is set to 0.7.

The projector optical system further satisfies conditional equation (9)

$$0.0001 < \Delta/f < 0.1 \qquad (9)$$

wherein Δ is the spreading width on the optical axis of the d-line, g-line, C-line and F-line spectra.

Conditional equation (9) prescribes the condition for appropriate axial chromatic aberration correction. Beyond the upper limit of conditional equation (9) chromatic aberration becomes excessively large, and the image exhibits coloring, thus impairing image quality. Below the lower limit of conditional equation (9), conversely, the grating pitch tends to be too small, which in addition to making manufacture of the grating shape more difficult, results in increased flare on account of the narrow-pitch grating, thereby impairing image quality. With a view to bringing out the full effect of conditional equation (9), the upper limit thereof is preferably set to 0.02 and the lower limit is set to 0.0002.

During construction of an actual lens the below-described constitutional requirements are also preferably satisfied. Firstly, the incidence angle onto the diffraction optical surface D must be small with a view to reducing flare caused by the diffractive optical element surface. To that end, the diffraction optical surface D is preferably arranged on a surface, of either the first lens group G1 or the second lens group G2, facing the center of curvature on the aperture diaphragm S side. As explained above, preferred results can be obtained by making the angle not larger than 10 degrees, but preferably the angle is made not larger than 7 degrees, to obtain yet more desirable effects. The lens on which the diffraction optical surface D is arranged may be a positive lens or a negative lens.

For achieving good chromatic aberration correction, the first lens group G1 and the second lens group G2 may comprise a cemented lens. In that case the cemented lens has preferably an Abbe number difference of 15 or more. In that case, also, the diffraction optical surface D may be formed in the cementing surface. This is preferable since the actual article afforded thereby has enhanced durability.

To achieve moreover good diffraction efficiency across a wavelength wide band, the value of ΔNd/Δ(NF−NC), for the two optical materials (optical element components) that make up the grating, lies within a predetermined range, wherein ΔNF is a refractive index difference for the F-line and ΔNC is a refractive index difference for the C-line. The range −15<ΔNd/Δ(NF−NC)<−2 holds preferably in the present embodiment. Moreover, ΔNF<ΔNC is preferably satisfied as well. Beyond those ranges, good diffraction efficiency cannot be achieved across a wavelength wide band.

The first through third lens groups G1 to G3 may all comprise single convex lenses made of resin. The density of resin is ordinarily small, of ½ to ⅓ of the density of glass, and hence resin is highly useful for reducing the weight of the projector optical system PS. When using three positive lenses, there are arranged, preferably, a positive meniscus lens, a positive meniscus lens and a biconvex lens (field lens), in that order.

In such a projector optical system PS, the second lens group G2 comprises preferably a positive lens. The second lens group G2 has preferably a positive refractive power. Such a constitution allows shortening the overall length of the projector optical system PS.

Preferably, both surfaces of the third lens group G3 are aspherical surfaces. That is preferable as it allows achieving both good aberration correction while keeping the angle with which light rays pass through the system at 5 degrees or less. With a view to bringing out a sufficient chromatic aberration correction effect, and in order to correct the secondary spectrum that the diffraction optical surface D fails to correct, a cemented lens comprising a positive lens and a negative lens can be provided in the third lens group G3.

The size of such a projector optical system PS can be reduced through a constitution having four or fewer positive lens components and one negative lens component. The projector optical system may comprise four or more positive lens components, or three positive lens components. A constitution with three positive lenses affords further size reduction.

In the projector optical system PS, scaling and focusing for a close-distance object can be carried out through scaling and through so-called floating focus in which the first lens group G1 and the second lens group G2 are thrust out towards the object (projection surface side). Focusing, in particular, may involve displacing the first lens group G1 and the second lens group G2 as a whole, or displacing a partial group of the first lens group G1.

The projector optical system PS according to the present embodiment may comprise a vibration-proof lens system in which there are assembled shake detection means for detecting the shake of the lenses that make up the projector optical system PS; a shake control device for setting a shake correction amount on the basis of a signal from the shake detection means and a signal from control means for controlling the operation sequence of the projector; and a driving mechanism for moving a vibration-proof lens on the basis of the shake correction amount. Such a constitution allows the projector in which the optical system PS is installed to enlarge and project images while being manually held. The element actually moved for preventing vibration may be the first lens group G1 and the second lens group G2 as a whole, or in particular, a partial group among these lens groups.

For manufacturing an actual diffraction optical surface, an easy and hence preferable way is to create, on a lens surface, a grating structure that is rotationally symmetrical vis-à-vis the optical axis, for instance a Fresnel zone plate or the like. This can be done by precision grinding or glass molding, as in the manufacture of ordinary aspherical lenses. The grating structure may also be formed on the lens surface by means of a thin resin layer. The grating is not limited to a pure single-layer structure such as a kinoform structure or the like, but is advantageously formed by staking plural grating structures, as this allows enhancing the wavelength characteristic and/or the image angle characteristic of the diffraction efficiency.

Figure 4:
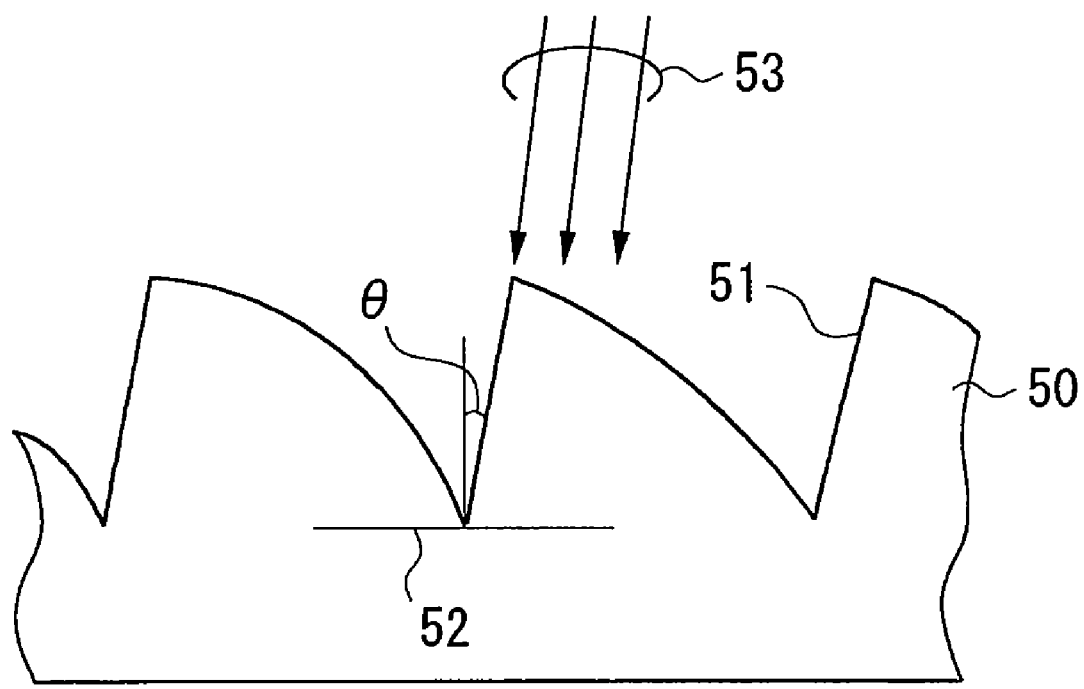
FIG. 4 is a cross-sectional diagram of an enlarged relevant portion of a diffractive optical element.

The blazed portions of the diffraction grating that forms the diffraction optical surface D need not necessarily be parallel to the optical axis, and may form an angle in the direction along which the light bundles pass. FIG. 4 illustrates an optical element component 50, having a positive lens functionality, in which there is formed a diffraction grating having a concentric periodic structure, the optical axis being herein disposed on the left of the figure. A boundary side surface 51 formed on the diffraction grating is tilted at a predefined angle θ relative to the normal of a reference boundary surface 52. As a result, representative incident light rays 53 are incident, as convergent light, parallel to the boundary surface 51, at a representative incidence angle θ. In this case, causing the blazed portions to face the pupil of the optical system arguably allows flare to be reduced.

The diffraction optical surface D is preferably of a bonded multilayer type in which members (optical element components) that form a grating are closely bonded to each other, and the thickness of the optical element component having the smaller thickness on the optical axis is, preferably, of 0.5 mm or less, with a view to preventing light loss through absorption. An identical optical system can be obtained herein by arranging also the optical element components leaving a small air gap in between (decoupled multilayer type).

EXAMPLES

Three examples of the projector optical system PS according to the present invention are explained next. In the examples, the phase difference of the diffraction optical surface D of the optical element components formed on the second lens group G2 (hereinafter, diffraction optical surface D) is calculated in accordance with an ultrahigh refractive index method using ordinary refractive indices and the below-described aspherical surface equation (a). The ultrahigh refractive index method uses a determined equivalence relationship between aspherical surface shape and the grating pitch of a diffractive optical surface. In the examples, the diffractive optical surfaces are represented by data obtained in accordance with the ultrahigh refractive index method, i.e., on the basis of the below-described aspherical equation (a) and coefficients thereof. The aberration characteristics selected for calculations in the examples correspond to the d-line, the g-line, the C-line and the F-line. The wavelengths for the d-line, the g-line, the C-line and the F-line used in the present examples, as well as the refractive index values set for each spectral line and used in the calculation according to the ultrahigh refractive index method, are given in Table 1.

TABLE 1

| Wavelength | | Refractive index (according to the ultrahigh refractive index method) |
|---|---|---|
| d-line | 587.562 nm | 10001 |
| g-line | 435.835 nm | 7418.6853 |
| C-line | 656.273 nm | 11170.4255 |
| F-line | 486.133 nm | 8274.7311 |

In the examples, the aspherical surface is given by the equation (a). Herein, the paraxial curvature radius R is given by equation (b)

$$S(y) = (y^2/r)/\{1+(1-\kappa \cdot y^2/r^2)^{1/2}\} C_2 \cdot y^2 + C_4 \cdot y^4 + C_6 \cdot y^6 + C_8 \cdot y^8 + C_{10} \cdot y^{10} + \quad (a)$$

$$R = 1/(1/r + 2C_2) \quad (b)$$

wherein y is the height in the direction perpendicular to the optical axis, S(y) is the distance (sag) along the optical axis from a tangential plane at the apex of the aspherical surface to a position on the aspherical surface at the height y, r is the curvature radius (apex curvature radius) of a reference spherical surface, k is a conic coefficient, and Cn are n-th order aspherical surface coefficients.

In the examples, the lens surfaces formed as an aspherical surface are marked in the tables with an asterisk * to the right of the surface number. The aspherical surface equation (a) represents data on the performance of the diffractive optical surface.

Among the lens data, the coefficient $C_2$, which is the paraxial power of the diffraction optical surface, is an important magnitude for achromatism. The range $|1 \times 10^{-10}| < C_2 < |1 \times 10^{-4}|$ holds preferably in the present examples. Beyond that range, good achromatism cannot be achieved.

First Example

Figure 5:
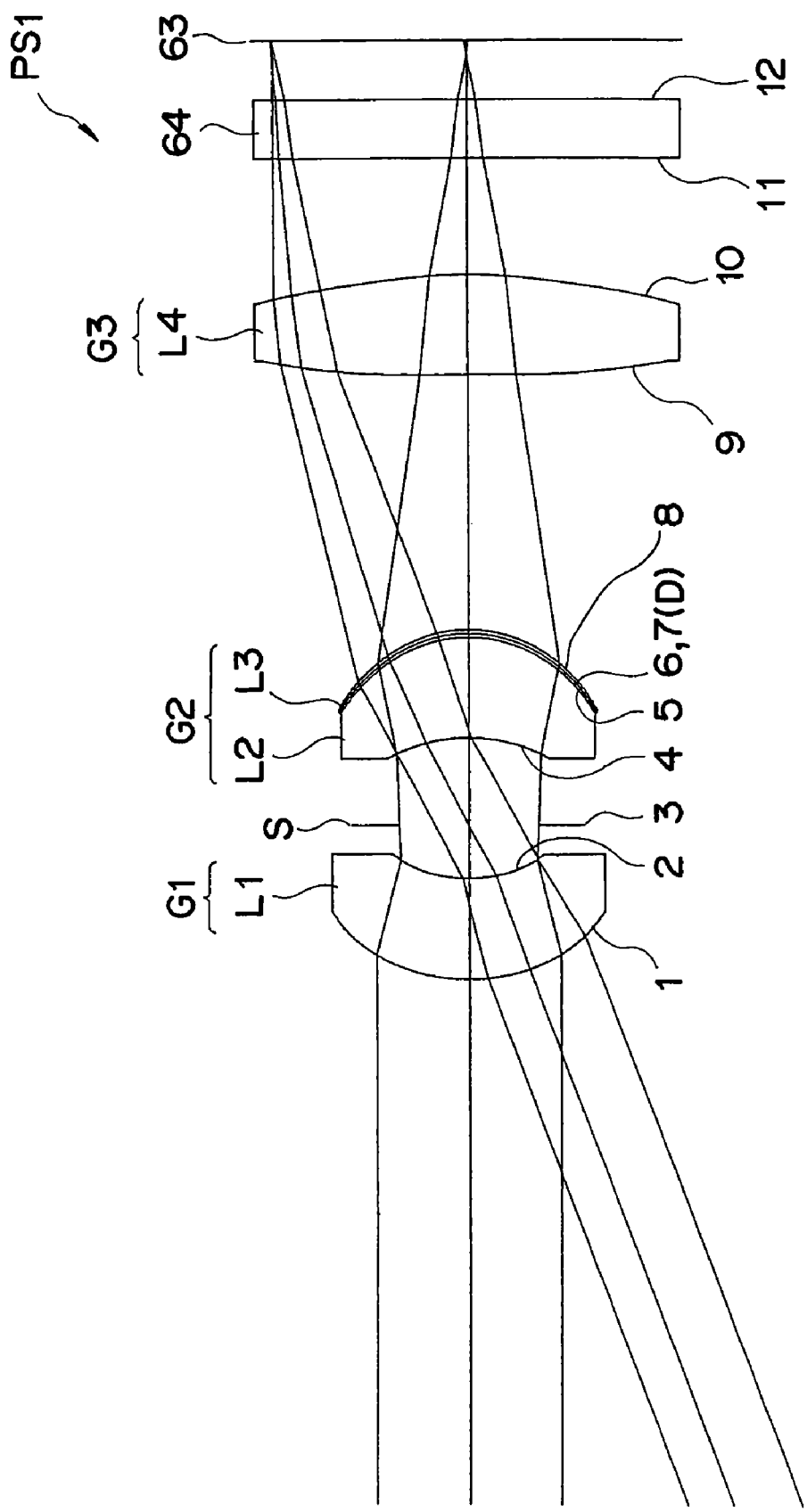
FIG. 5 is a diagram illustrating the lens constitution of a projector optical system according to a first example.

FIG. 5 illustrates a first example of the projector optical system according to the present application. The projector optical system PS1 comprises, sequentially from a screen side or an observation side, a first lens group G1, an aperture diaphragm S, a second lens group G2, a third lens group G3 a protective glass 64 and a display element 63. FIG. 5 illustrates an instance in which an image is formed on the display element 63 by light rays irradiated from the screen side or the observation side (i.e., an instance of inverse ray tracing). In the first example, the first lens group G1 comprises a negative meniscus lens L1 having a convex surface thereof facing towards the screen side or the observation side, the second lens group G2 comprises a positive meniscus lens L2 having the concave surface thereof facing towards the screen side or the observation side, and a bonded multilayer diffractive optical element L3 cemented to the convex surface of the positive meniscus lens L2, while the third lens group G3 comprises a biconvex lens L4.

Table 2 illustrates various data of the projector optical system PS1 according to the first example as illustrated in FIG. 5. In table 2, the first column m represents the number of the various optical surfaces, from the screen side or the observation side, that correspond to the surface numbers 1 to 12 illustrated in FIG. 5 (an asterisk * to the right indicates a lens surface formed as a diffraction optical surface). The second column r represents the radius of curvature of the optical surface (the radius of curvature of a baseline reference spherical surface, in the case of a diffraction optical surface), the third column d represents the distance on the optical axis from the respective optical surface to the next optical surface, and the fourth column nd, the fifth column ng, the sixth column nC and the seventh column nF represent the refractive indices for the respective d-line, g-line, C-line and F-line. In the aspherical surface data, the n-th order aspherical surface coefficient Cn equal to 0 (zero) has been omitted. The values corresponding to the above-described conditional equations (1) through (9), i.e. the condition-corresponding values, are also indicated below. The above explanation applies also for the tables in the other examples.

Unless otherwise specified, the units used for the radius of curvature r, the surface gap d and other lengths are "mm" for all the values below. The units, however, are not limited to "mm", and other suitable units may be used, since the same optical performance is obtained when proportionally expanding or contracting the optical radius.

TABLE 2

| m | r | d | nd | ng | nC | nF |
|---|---|---|---|---|---|---|
| 1 | 5.12381 | 2.60000 | 1.772789 | 1.792324 | 1.768074 | 1.783701 |
| 2 | 4.04774 | 1.35952 | 1.000000 | | | |
| 3 | 0.00000 | 2.25447 | 1.000000 | | | |
| 4 | −4.62213 | 2.60000 | 1.524700 | 1.536490 | 1.521960 | 1.531290 |
| 5 | −3.51556 | 0.10000 | 1.527600 | 1.547700 | 1.523300 | 1.538500 |
| 6* | −3.51556 | 0.00000 | 10001 | 7418.6853 | 11170.4255 | 8274.7311 |

TABLE 2-continued

| m | r | d | nd | ng | nC | nF |
|---|---|---|---|---|---|---|
| 7 | −3.51555 | 0.10000 | 1.556900 | 1.571100 | 1.553700 | 1.564800 |
| 8 | −3.51556 | 6.60440 | 1.000000 | | | |
| 9 | −256.99796 | 2.60000 | 1.524700 | 1.536490 | 1.521960 | 1.531290 |
| 10 | −12.68192 | 3.00000 | 1.000000 | | | |
| 11 | 0.00000 | 1.50000 | 1.516330 | 1.526210 | 1.513860 | 1.521910 |
| 12 | 0.00000 | 1.53150 | 1.000000 | | | |

Aspherical Surface Data

First surface $\kappa=1.5380$ $C_4=7.36370\times10^{-4}$ $C_6=-4.20590\times10^{-5}$ $C_8=6.91950\times10^{-6}$ $C_{10}=-3.57820\times10^{-8}$ Second surface $\kappa=1.9242$ $C_4=3.45880\times10^{-3}$ $C_6=-3.36830\times10^{-4}$ $C_8=2.05110\times10^{-4}$ $C_{10}=4.50100\times10^{-8}$ Fourth surface $\kappa=0.8378$ $C_4=-1.46690\times10^{-3}$ $C_6=-1.83100\times10^{-4}$ $C_8=-1.32370\times10^{-6}$ $C_{10}=6.12060\times10^{-8}$ Fifth surface $\kappa=0.8720$ $C_4=9.34140\times10^{-5}$ $C_6=6.93480\times10^{-5}$ $C_8=-3.81460\times10^{-6}$ $C_{10}=8.22950\times10^{-8}$ Sixth surface $\kappa=0.8720$ $C_4=9.34140\times10^{-5}$ $C_6=6.93480\times10^{-5}$ $C_8=-3.81460\times10^{-6}$ $C_{10}=8.22950\times10^{-8}$ Seventh surface $\kappa=0.8720$ $C_4=9.34390\times10^{-5}$ $C_6=6.93470\times10^{-5}$ $C_8=-3.81490\times10^{-6}$ $C_{10}=8.23300\times10^{-8}$ Eighth surface $\kappa=0.8720$ $C_4=9.34390\times10^{-5}$ $C_6=6.93470\times10^{-5}$ $C_8=-3.81490\times10^{-6}$ $C_{10}=8.23300\times10^{-8}$ Ninth surface $\kappa=2387.8224$ $C_4=1.33500\times10^{-3}$ $C_6=-4.32180\times10^{-5}$ $C_8=7.44470\times10^{-7}$ $C_{10}=-4.44160\times10^{-9}$ Tenth surface $\kappa=-11.6451$ $C_4=6.46010\times10^{-4}$ $C_6=-2.99600\times10^{-5}$ $C_8=4.55560\times10^{-7}$ $C_{10}=-3.45930\times10^{-9}$ Condition-Corresponding Values G=6.6044
L=24.250
Δvd=15.46
C=5.6
f=12.959
Eg=98.221
EC=98.233
Ed=99.999
h=0.02
d=0.1
f1=468.253
f2=13.047
f3=25.332
Δ=0.0838

$$G/L=0.2723 \qquad (1)$$

$$\Delta Nd=0.0293 \qquad (2)$$

$$\Delta vd/\Delta Nd=527.65 \qquad (3)$$

$$C/f=0.432 \qquad (4)$$

$$(Eg+EC)/2=98.227$$

$$0.6\times Ed=59.999 \qquad (5)$$

$$h/d=0.2 \qquad (6)$$

$$f1/f2=35.890 \qquad (7)$$

$$f3/f=1.955 \qquad (8)$$

$$\Delta/f=0.00647 \qquad (9)$$

Figure 6:
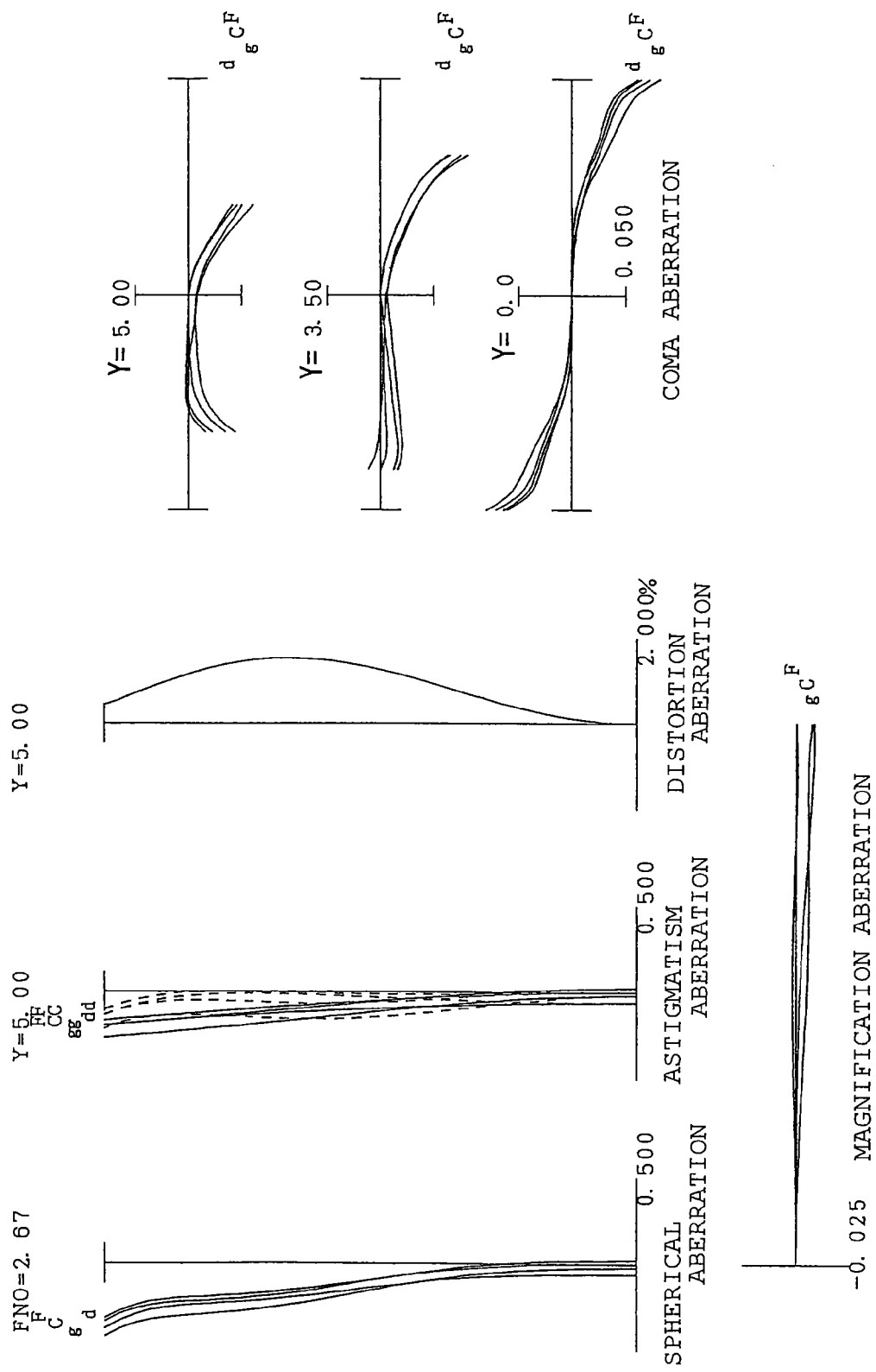
FIG. 6 is a set of aberration graphs of the projector optical system according to the first example.

As can be seen, all conditional equations (1) through (9) are satisfied in the first example. FIG. 6 illustrates various aberration graphs, for spherical aberration, astigmatism, distortion, coma and magnification chromatic aberration in the projector optical system PS1 of the first example, with focus at infinity. In the aberration graphs, FNO is the F-number and Y is the image height. In the spherical aberration graph there is represented the value of the F-number corresponding to maximum aperture. In the astigmatism graph and the distortion graph there are illustrated the largest values of image height, while in the coma aberration graph there are illustrated various image heights. In the astigmatism graph, the solid line is the sagittal image surface, while the broken line is the meridional image surface. The above explanation of the aberration graphs applies equally to the other examples. As the various aberration graphs of FIG. 6 clearly indicate, the first example affords good aberration correction, thereby ensuring excellent image forming performance.

Second Example

Figure 7:
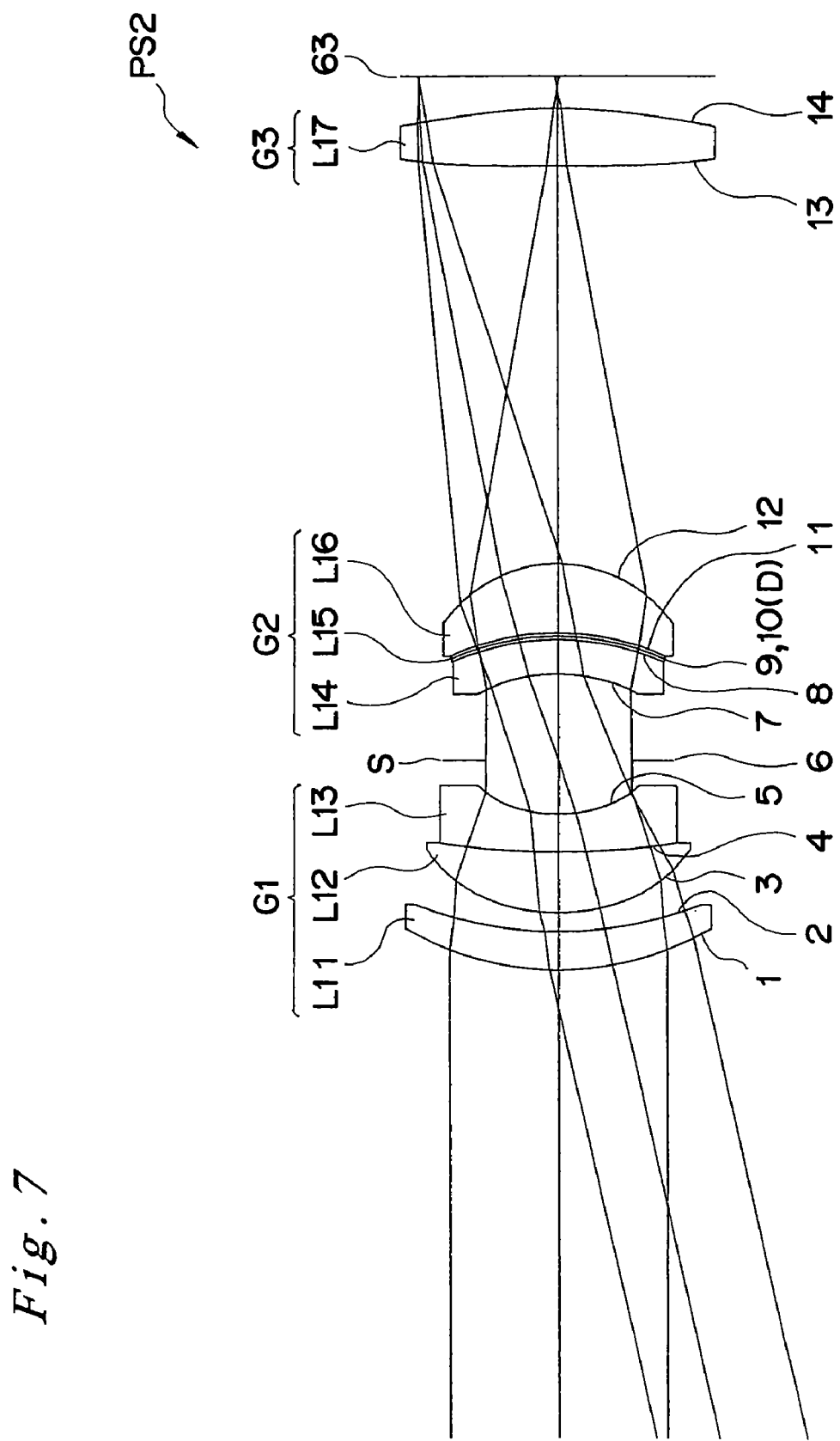
FIG. 7 is a diagram illustrating the lens constitution of a projector optical system according to a second example.

FIG. 7 illustrates next a second example of a projector optical system PS2 according to the present application. The projector optical system PS2 comprises, sequentially from a screen side or an observation side, a first lens group G1, an aperture diaphragm S, a second lens group G2, a third lens group G3 and a display element 63. FIG. 7 illustrates an instance of inverse ray tracing. In the second example, the first lens group G1 comprises a cemented lens in which there are cemented a negative meniscus lens L11 having a convex surface thereof facing towards the screen side or the observation side, a positive meniscus lens L12 having a convex surface thereof facing towards the screen side or the observation side, and a negative meniscus lens L13 having a convex surface thereof facing towards the screen side or the observation side; the second lens group G2 comprises a cemented lens in which there are cemented a positive meniscus lens L14 having a concave surface thereof facing towards the screen side or the observation side, a multilayer diffractive optical element L15, and a positive meniscus lens L16 having a concave surface thereof facing towards the screen side or the observation side; and the third lens group G3 comprises a biconvex lens L17.

Table 3 illustrates various data of the projector optical system PS2 according to the second example as illustrated in FIG. 7. The surface numbers listed in Table 3 correspond to the surface numbers 1 through 14 illustrated in FIG. 7.

TABLE 3

| m | r | d | nd | ng | nC | nF |
|---|---|---|---|---|---|---|
| 1 | 8.80000 | 1.10000 | 1.524700 | 1.536490 | 1.521960 | 1.531290 |
| 2 | 11.20226 | 0.55000 | 1.000000 | | | |
| 3 | 5.63619 | 1.75000 | 1.744429 | 1.763231 | 1.739893 | 1.754927 |
| 4 | 22.00000 | 1.10000 | 1.762000 | 1.786340 | 1.756390 | 1.775390 |
| 5 | 4.45252 | 1.54000 | 1.000000 | | | |
| 6 | 0.00000 | 2.50000 | 1.000000 | | | |
| 7 | −5.17000 | 1.00000 | 1.582760 | 1.607990 | 1.577240 | 1.596450 |
| 8 | −7.48000 | 0.10000 | 1.527600 | 1.547700 | 1.523300 | 1.538500 |
| 9* | −7.48000 | 0.00000 | 10001 | 7418.6853 | 11170.4255 | 8274.7311 |
| 10 | −7.48000 | 0.10000 | 1.556900 | 1.571100 | 1.553700 | 1.564800 |
| 11 | −7.48000 | 2.00000 | 1.524700 | 1.536490 | 1.521960 | 1.531290 |
| 12 | −3.86711 | 11.55000 | 1.000000 | | | |
| 13 | −282.69776 | 1.65000 | 1.524700 | 1.536490 | 1.521960 | 1.531290 |
| 14 | −13.95011 | 0.91521 | 1.000000 | | | |

Aspherical Surface Data
Third surface $\kappa=1.5380$ $C_4=5.86030\times10^{-4}$ $C_6=-2.61150\times10^{-5}$ $C_8=3.55080\times10^{-6}$ $C_{10}=-1.51750\times10^{-8}$
Fifth surface $\kappa=1.9242$ $C_4=2.59860\times10^{-3}$ $C_6=-2.09140\times10^{-4}$ $C_8=1.05250\times10^{-4}$ $C_{10}=41.90890\times10^{-8}$
Seventh surface $\kappa=0.8378$ $C_4=-1.10210\times10^{-3}$ $C_6=-1.13690\times10^{-4}$ $C_8=-6.79270\times10^{-7}$ $C_{10}=2.59570\times10^{-8}$
Tenth surface $\kappa=1.0000$ $C_2=-2.72730\times10^{-7}$
Twelfth surface $\kappa=0.8720$ $C_4=7.01830\times10^{-5}$ $C_6=4.30600\times10^{-5}$ $C_8=-1.95750\times10^{-6}$ $C_{10}=-3.49010\times10^{-8}$
Thirteenth surface
$\kappa=2387.8224$ $C_4=1.00300\times10^{-3}$ $C_6=-2.68350\times10^{-5}$ $C_8=3.82030\times10^{-7}$ $C_{10}=-1.88370\times10^{-9}$
Fourteenth surface
$\kappa=-11.6451$ $C_4=4.85360\times10^{-4}$ $C_6=-1.86030\times10^{-5}$ $C_8=2.33770\times10^{-7}$ $C_{10}=-1.46710\times10^{-9}$ Condition-Corresponding Values
G=11.55
L=25.855
Δvd=15.46
C=4.87
f=17.476
Eg=98.221
EC=98.233
Ed=99.999
h=0.02
d=0.1
f1=57.198
f2=15.103
f3=27.908
Δ=0.0309

$G/L=0.4467$ (1)

$\Delta Nd=0.0293$ (2)

$\Delta vd/\Delta Nd=527.65$ (3)

$C/f=0.279$ (4)

$(Eg+EC)/2=98.227$ $0.6\times Ed=59.999$ (5)

$h/d=0.2$ (6)

$f1/f2=3.787$ (7)

$f3/f=1.597$ (8)

$\Delta/f=0.00177$ (9)

Figure 8:
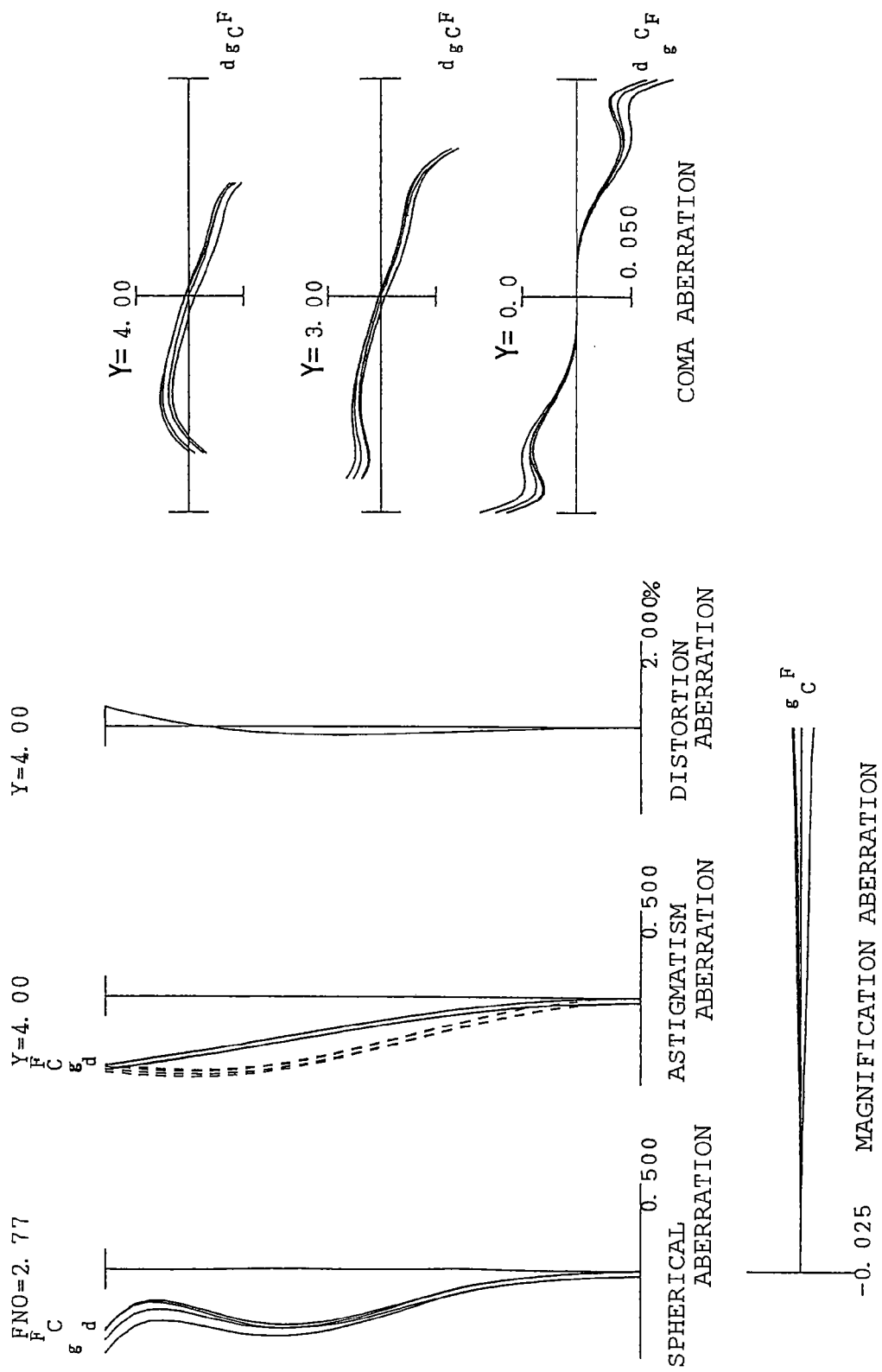
FIG. 8 is a set of aberration graphs of the projector optical system according to the second example.

As can be seen, all conditional equations (1) through (9) are satisfied in the second example. FIG. 8 illustrates various aberration graphs, for spherical aberration, astigmatism, distortion, coma and magnification chromatic aberration in the projector optical system PS2 of the second example, with focus at infinity. As the various aberration graphs of FIG. 8 clearly indicate, the second example also affords good aberration correction, thereby ensuring excellent image forming performance.

Third Example

Figure 9:
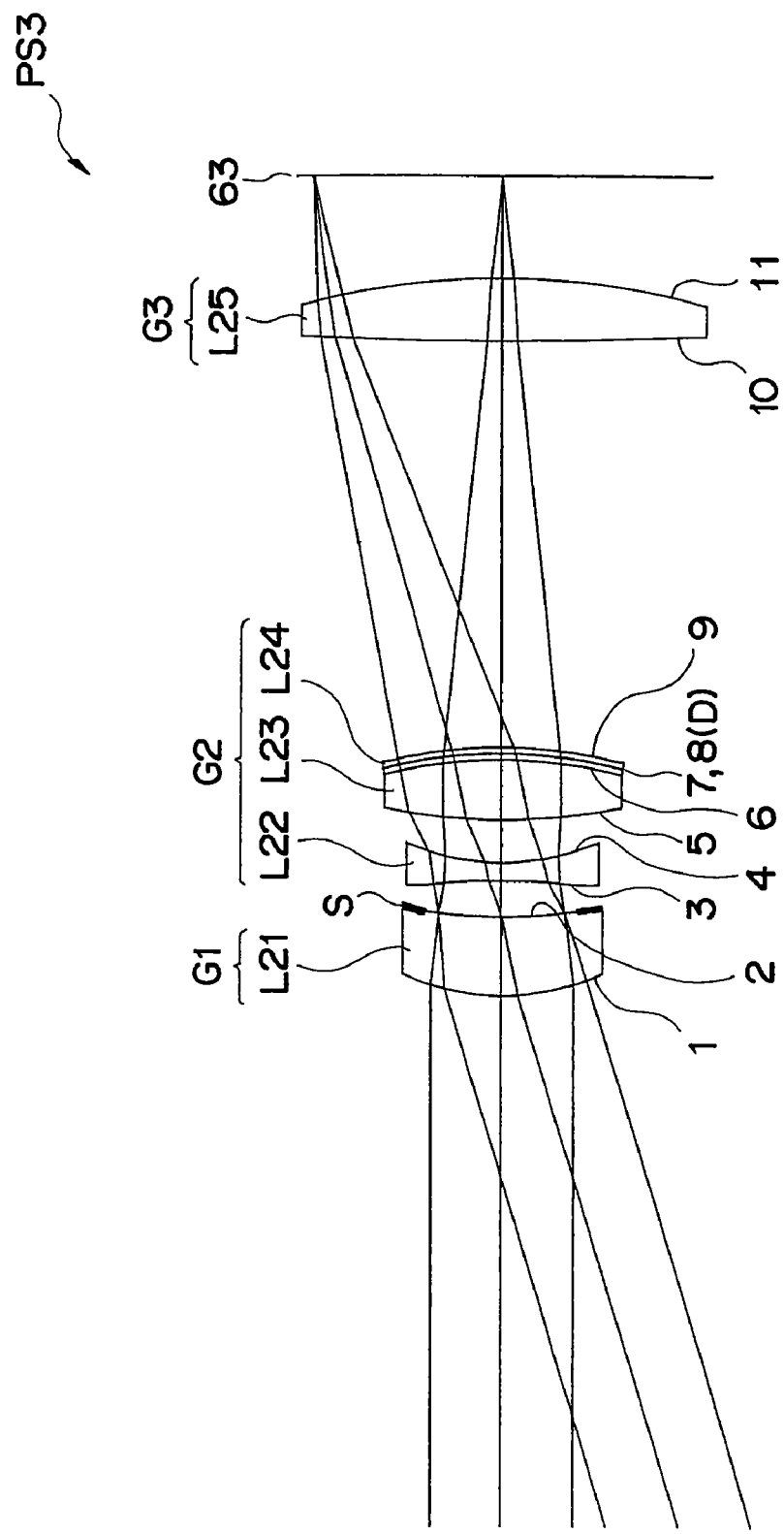
FIG. 9 is a diagram illustrating the lens constitution of a projector optical system according to a third example.

FIG. 9 illustrates next a third example of the projector optical system PS3 according to the present application. A projector optical system PS3 comprises, sequentially from a screen side or an observation side, a first lens group G1, an aperture diaphragm S, a second lens group G2, a third lens group G3 and a display element 63. FIG. 9 illustrates an instance of inverse ray tracing. In the third example, the first lens group G1 comprises a negative meniscus lens L21 having a convex surface thereof facing towards the screen side or the observation side; the second lens group G2 comprises a biconcave lens L22, a biconvex lens L23, and a bonded multilayer diffractive optical element L24 cemented to the biconvex lens L23 on the display element 63 side thereof; while the third lens group G3 comprises a biconvex lens L25. The aperture diaphragm S is formed on the outer periphery of the negative meniscus lens L21 that makes up the first lens group G1, on the display element 63 side.

Table 4 illustrates various data of the projector optical system PS3 according to the third example as illustrated in FIG. 9. The surface numbers listed in Table 4 correspond to the surface numbers 1 through 11 illustrated in FIG. 9.

TABLE 4

| m | r | d | nd | ng | nC | nF |
|---|---|---|---|---|---|---|
| 1 | 7.68000 | 2.52000 | 1.696800 | 1.712319 | 1.692982 | 1.705514 |
| 2 | 17.71200 | 1.15200 | 1.000000 | | | |

TABLE 4-continued

| m | r | d | nd | ng | nC | nF |
|---|---|---|---|---|---|---|
| 3 | −23.20800 | 0.57600 | 1.595071 | 1.616844 | 1.590169 | 1.606927 |
| 4 | 7.68000 | 1.36800 | 1.000000 | | | |
| 5 | 18.57600 | 1.92000 | 1.713000 | 1.729417 | 1.708984 | 1.722206 |
| 6 | −15.43200 | 0.20000 | 1.556900 | 1.570900 | 1.553600 | 1.564700 |
| 7* | −15.43200 | 0.00000 | 10001 | 7418.6853 | 11170.4255 | 8274.7311 |
| 8 | −15.43200 | 0.20000 | 1.518900 | 1.538000 | 1.514400 | 1.528900 |
| 9 | −15.43200 | 13.00000 | 1.000000 | | | |
| 10 | 125.00000 | 2.00000 | 1.516800 | 1.526703 | 1.514322 | 1.522384 |
| 11 | −25.00000 | 3.27803 | 1.000000 | | | |

Aspherical Surface Data
Eighth surface $\kappa=1.0000$ $C_2=-6.0000\times10^{-8}$ Condition-Corresponding Values
G=13.000
L=26.213
$\Delta vd$=18.14
C=6.63
f=20.252
Eg=94.372
EC=96.490
Ed=99.706
h=0.015
d=0.2
f1=17.640
f2=12.007
f3=40.496
$\Delta$=0.00955

$$G/L=0.496 \quad (1)$$

$$\Delta Nd=0.038 \quad (2)$$

$$\Delta vd/\Delta Nd=477.37 \quad (3)$$

$$C/f=0.327 \quad (4)$$

$$(Eg+EC)/2=95.431$$

$$0.6\times Ed=59.824 \quad (5)$$

$$h/d=0.075 \quad (6)$$

$$f1/f2=1.496 \quad (7)$$

$$f3/f=2.000 \quad (8)$$

$$\Delta/f=0.00047 \quad (9)$$

Figure 10:
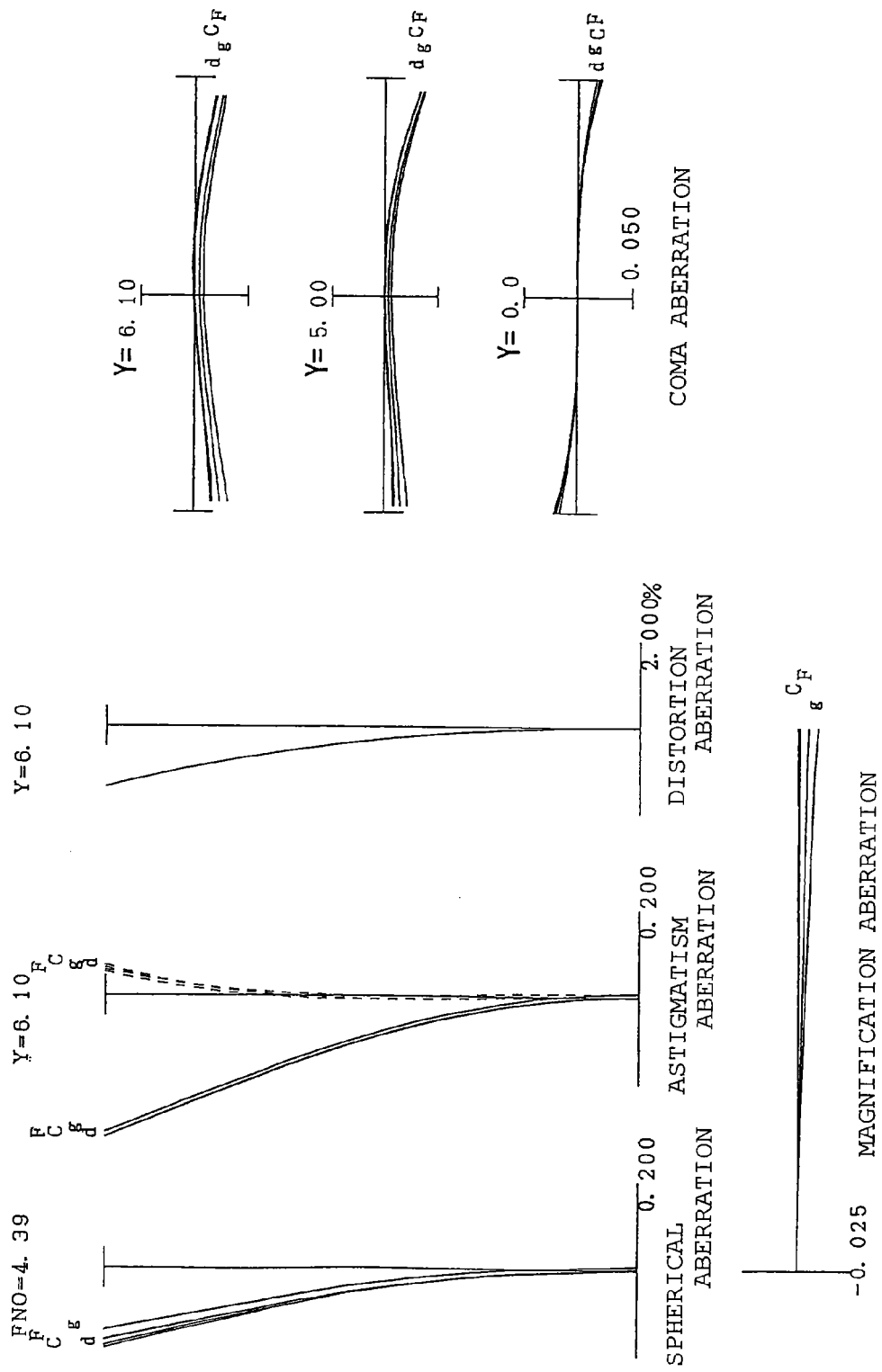
FIG. 10 is a set of aberration graphs of the projector optical system according to the third example.

As can be seen, all conditional equations (1) through (9) are satisfied in the third example. FIG. 10 illustrates various aberration graphs, for spherical aberration, astigmatism, distortion, coma and magnification chromatic aberration in the projector optical system PS3 of the third example, with focus at infinity. As the various aberration graphs of FIG. 10 clearly indicate, the third example also affords good aberration correction, thereby ensuring excellent image forming performance.

As explained above, providing a diffraction optical surface D in the projector optical systems PS1 to PS3 in the first through third examples allows achieving good image forming performance while achieving weight and size reductions. The projector optical systems PS1 to PS3 can thus be ideally used in, for instance, optical systems for small projectors. In the examples, the diffraction optical surface was formed on the second lens group, but it may also be formed on the first lens group alone, or on both the first lens group and the second lens group. Also, the projector optical system is not limited to optical systems for forming a real image, such as a projector or the like, but may also be used in optical systems for observing a virtual image, such as a viewer or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projector optical system for forming a real image by projecting an image of a display element, comprising:
    sequentially from a screen side or an observation side,
    a first lens group having positive refractive power;
    an aperture diaphragm;
    a second lens group;
    a third lens group having positive refractive power; and
    a diffractive optical element provided in at least one of said first lens group and said second lens group which are adjacent to said aperture diaphragm,
    the projector optical system satisfying:

$$0.05<G/L<0.9$$

wherein G is an air gap on an optical axis between said second lens group and said third lens group, and L is a length on the optical axis, from a surface that is closest to the screen side or the observation side to said display element.

2. The projector optical system as claimed in claim 1, wherein said diffractive optical element is formed by a multilayer diffractive optical element in which diffraction gratings formed on two diffractive element components are arranged facing each other.

3. The projector optical system as claimed in claim 2, wherein said diffractive optical element is formed by a bonded multilayer diffractive optical element in which diffraction gratings formed on two diffractive element components are arranged closely bonded facing each other.

4. The projector optical system as claimed in claim 2, further satisfying:

$$0.005<\Delta Nd<0.45$$

wherein $\Delta Nd$ is a difference between refractive indices of said two diffractive element components for a main wavelength (d-line).

5. The projector optical system as claimed in claim 2, further satisfying:

$$50<\Delta vd/\Delta Nd<2000$$

wherein $\Delta vd$ is an Abbe number difference between said two diffractive element components.

6. The projector optical system as claimed in claim 2, further satisfying:

$0.03 < h/d < 2.0$ wherein h is a grating height of said diffraction gratings that form said diffraction optical surface of said diffractive optical element, and d is a thickness of the diffractive element component having the smaller thickness on the optical axis, among said diffractive element components.

7. The projector optical system as claimed in claim 1, wherein said second lens group comprises a positive lens.

8. The projector optical system as claimed in claim 1, wherein said second lens group has positive refractive power.

9. The projector optical system as claimed in claim 1, configured to be symmetrical with respect to the optical axis, and configured such that a main light ray of a largest image height has an image ray angle not greater than 10 degrees when passing through the diffraction optical surface of said diffractive optical element, the projector optical system further satisfying:

$0.1 < C/f < 2.5$ wherein C is an effective diameter of said diffraction optical surface, and f is a whole-system focal distance.

10. The projector optical system as claimed in claim 1, further satisfying:

$(Eg+EC)/2 > 0.6 \times Ed$ wherein Ed is a diffraction efficiency design value for a main wavelength (d-line) of the diffraction optical surface of said diffractive optical element, Eg is a diffraction efficiency design value for a short wavelength (g-line) relative to said main wavelength, and EC is a diffraction efficiency design value for a long wavelength (C-line) relative to said main wavelength.

11. The projector optical system as claimed in claim 1, comprising a cemented lens of a positive lens, and a positive lens and a negative lens, wherein the diffraction optical surface of said diffractive optical element is formed adjacent to any surface of said positive lenses.

12. The projector optical system as claimed in claim 1, wherein a wall of said diffraction grating is imparted with a slope toward a pupil and is formed at a tilt relative to the optical axis.

13. The projector optical system as claimed in claim 1, comprising four or fewer positive lens components and one negative lens component.

14. The projector optical system as claimed in claim 1, comprising four or more positive lens components.

15. The projector optical system as claimed in claim 1, comprising three positive lens components.

16. The projector optical system as claimed in claim 1, comprising three positive lenses.

17. The projector optical system as claimed in claim 1, further satisfying:

$0.3 < f1/f2 < 100.0$ wherein f1 is a focal distance of said first lens group and f2 is a focal distance of said second lens group.

18. The projector optical system as claimed in claim 1, wherein said diffraction optical element is arranged on a surface facing a center of curvature on said aperture diaphragm side.

19. A projector comprising the projector optical system as claimed in claim 1, wherein a real image is formed on said display element by projecting light rays that are emitted from a light source and that are irradiated onto said display element, are reflected by or transmitted through said display element, and passing the light rays sequentially through said third lens group, said second lens group, said aperture diaphragm and said first lens group.

20. A method for forming a real image, in use of a projector optical system, by projecting an image of a display element, wherein said projector optical system comprises:
sequentially from a screen side or an observation side,
a first lens group having positive refractive power;
an aperture diaphragm;
a second lens group;
a third lens group having positive refractive power; and
a diffractive optical element provided in at least one of the first lens group and the second lens group which are adjacent to said aperture diaphragm,
the projector optical system satisfying:

$0.05 < G/L < 0.9$ wherein G is an air gap on an optical axis between said second lens group and said third lens group, and L is a length on the optical axis, from s surface that is closest to the screen side or the observation side to said display element.

21. The method for forming a real image in use of a projector optical system as claimed in claim 20, wherein said diffractive optical element is formed by a multilayer diffractive optical element in which diffraction gratings formed on two diffractive element components are arranged facing each other.

22. The method for forming a real image in use of a projector optical system as claimed in claim 20, wherein said projector optical system is symmetrical with respect to the optical axis and is configured such that a main light ray of a largest image height has an image ray angle not greater than 10 degrees when passing through the diffraction optical surface of said diffractive optical element, the projector optical system further satisfying:

$0.1 < C/f < 2.5$ wherein C is an effective diameter of said diffraction optical surface, and f is a whole-system focal distance.

* * * * *